US009266386B2

(12) United States Patent  
Wang

(10) Patent No.: US 9,266,386 B2  
(45) Date of Patent: Feb. 23, 2016

(54) WHEEL COVER FOR TRUCK FRONT WHEELS

(71) Applicant: Ming-Cheng Wang, Tainan (TW)

(72) Inventor: Ming-Cheng Wang, Tainan (TW)

(*) Notice: Subject to any disclaimer, the term of this patent is extended or adjusted under 35 U.S.C. 154(b) by 337 days.

(21) Appl. No.: 13/957,453

(22) Filed: Aug. 2, 2013

(65) Prior Publication Data

US 2015/0035346 A1 Feb. 5, 2015

(51) Int. Cl.
*B60B 7/06* (2006.01)
*B60B 7/04* (2006.01)
*B60B 7/00* (2006.01)

(52) U.S. Cl.
CPC ............... *B60B 7/0013* (2013.01); *B60B 7/04* (2013.01); *B60B 7/06* (2013.01); *B60B 7/066* (2013.01); *B60B 7/068* (2013.01)

(58) Field of Classification Search
CPC ........ B60B 7/0013; B60B 7/06; B60B 7/066; B60B 7/068; B60B 7/0093; B60B 7/04
See application file for complete search history.

(56) References Cited

U.S. PATENT DOCUMENTS

| | | | | |
|---|---|---|---|---|
| 4,240,670 | A * | 12/1980 | Zorn et al. | 301/35.622 |
| 6,135,570 | A * | 10/2000 | Wieczorek | 301/37.374 |
| D583,290 | S * | 12/2008 | Wang | D12/207 |
| D585,801 | S * | 2/2009 | Wang | D12/207 |
| D627,697 | S * | 11/2010 | Wang | D12/207 |
| D629,731 | S * | 12/2010 | Wang | D12/207 |
| 2003/0001430 | A1* | 1/2003 | Wang | 301/108.4 |
| 2003/0067212 | A1* | 4/2003 | Wrase et al. | 301/37.43 |
| 2003/0090143 | A1* | 5/2003 | Bruce | 301/108.4 |
| 2005/0073191 | A1* | 4/2005 | Gerard | 301/37.101 |
| 2009/0278400 | A1* | 11/2009 | Wang | 301/108.1 |
| 2010/0014303 | A1* | 1/2010 | Wang | 362/500 |
| 2011/0062771 | A1* | 3/2011 | Capuzzi | 301/108.1 |

* cited by examiner

*Primary Examiner* — Kip T Kotter

(57) ABSTRACT

A wheel cover for a front wheel of a truck includes a main body, a central cap, at least two washers, multiple bolt caps, and an insulation plate. The main body defines a central hole and multiple recesses. The insulation plate, which defines a central hole and multiple through holes, is located between the main body and a rim of a front wheel, such that the recesses of the main body and the through holes of the insulation plate are aligned to receive bolts and nuts provided for the rim of the front wheel. The two washers are fitted into two of the recesses of the main body, around the corresponding bolts, and fixed by the corresponding nuts, so that the main body is assembled to the front wheel. The bolt caps can be respectively fitted into the recesses of the main body to cover the bolts and the nuts.

5 Claims, 8 Drawing Sheets

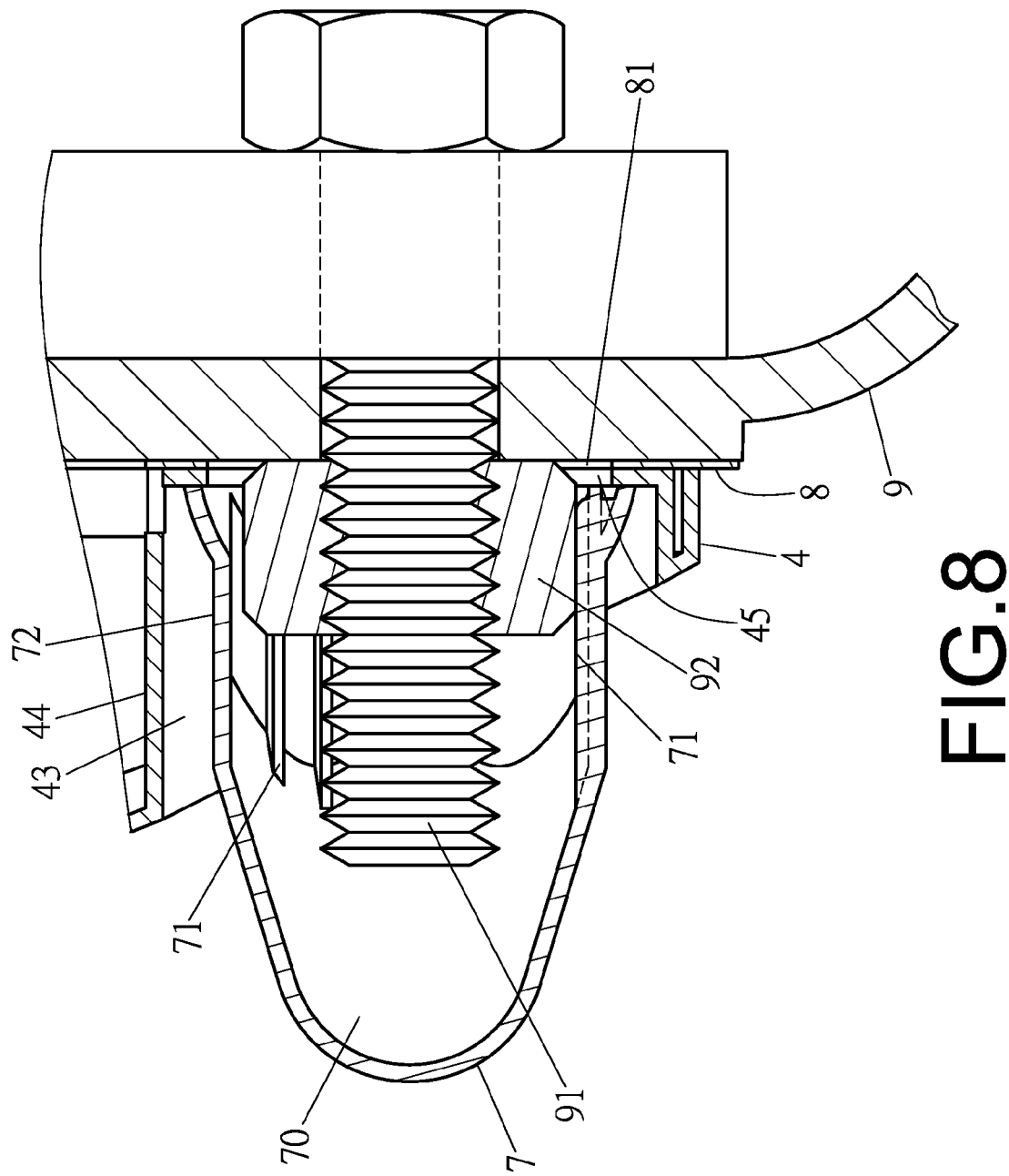

WHEEL COVER FOR TRUCK FRONT WHEELS

FIELD OF THE INVENTION

The present invention relates to a wheel cover, and more particularly, to a wheel cover for truck front wheels.

BACKGROUND OF THE INVENTION

For hiding the axle, bolts, and nuts of a front wheel of a truck, a wheel cover is often installed to the rim of the front wheel. As shown in FIG. 1, the wheel cover 1 is used to hide the axle 20 and the bolts 21 and nuts 22 of the rim 2, wherein the wheel cover 1 generally comprises a body 10 which has a generally conical surface 11 and a flat surface 12 formed at the top of the generally conical surface 11. Multiple holes 13 are defined at the flat surface 12. Each bolt 21 is inserted through one of the holes 13 to be connected with a nut 22 from outside of the body 10 so as to fix the wheel cover 1 to the rim 2. However, when assembling the wheel cover 1 to the rim 2, all of the nuts 22 have to removed from the bolts 21 before the wheel cover 1 is mounted to the rim 2. Although the axle 20 can be hidden by the wheel cover 1, the nuts 22 and the ends of the bolts 21 are exposed. Furthermore, the tightness of the nuts 22 has to be checked to ensure that the nuts 22 are fastened properly.

Another wheel cover 3 is shown in FIG. 2, which includes a body 30 having a generally conical surface 31 and a flat surface 32 formed at the top of the generally conical surface 31. At least two holes 33 are defined at the flat surface 32. At least two connection members 35 are located at the inside of the body 30. One end of each connection member 35 is connected to one bolt 21, and the other end of each connection member 35 is inserted through one hole 33 of the flat surface 32 for connecting to a connection part 34. The wheel cover 3 is fixed to the rim 2 by the at least two connection members 35 and the connection parts 34. However, when the length of the bolts for a rim is too short, it is difficult for the connection members 35 to connect with the bolts properly. Therefore, vibration may cause the wheel cover 3 to become loose or even drop off while the truck is moving.

The present invention intends to provide a wheel cover for a front wheel of a truck for solving the shortcomings of the conventional ones.

SUMMARY OF THE INVENTION

The present invention relates to a wheel cover for a front wheel of a truck, which comprises a main body, a central cap, at least two washers, multiple bolt caps, and an insulation plate. The main body defines a central hole and multiple recesses around the central hole for receiving bolts and nuts provided for a rim of a front wheel. Each recess is formed by a surrounding wall and a bottom which constitute part of the main body, wherein the bottom of each recess defines a through hole; the surrounding wall of each recess defines a positioning hole and is provided with a resilient protrusion near the bottom of the recess.

The central cap is provided for covering the central hole of the main body, wherein the central cap has multiple insertions extending from an outer edge of the central cap. Each of the two washers has an inner circular edge and an outer circular edge, wherein the inner circular edge is formed into an engagement ring and defines a central hole, and the outer circular edge defines a notch and is provided with an engaging member. Each washer is fitted in one of the recesses of the main body, around the corresponding bolt, and fixed by the corresponding nut such that the notch thereof is engaged with the resilient protrusion provided at the surrounding wall of the recess while the engaging member thereof is engaged with the positioning hole defined at the surrounding wall of the recess.

Each of the bolt caps is fitted into one of the recesses of the main body and defines a space for accommodating the corresponding bolt and the corresponding nut, wherein an inner surface of each bolt cap that defines the accommodating space is provided with multiple ridges for engaging with the corresponding nut.

The insulation plate defines a central hole and multiple through holes around the central hole thereof. Furthermore, the insulation plate is provided with multiple positioning blocks around its central hole, wherein the through holes and the positioning blocks are alternately arranged. The insulation plate is located between the main body and an outer surface of the rim of the front wheel such that the central hole of the insulation plate is aligned with the central hole of the main body, while the through holes of the insulation plate are aligned with the recesses of the main body.

Preferably, the main body is provided with an engagement ring and two engagement tabs at an inner edge thereof which defines the central hole of the main body. The central cap is mounted to the main body such that the insertions thereof are engaged with the engagement ring of the main body, while each of the engagement tabs of the main body is located between two adjacent insertions of the central cap.

Preferably, the central cap has an enclosed flange at its inner surface.

Preferably, the main body is provided with a first index mark near an inner edge thereof which defines the central hole of the main body. The central cap is provided with a second index mark near its outer edge, which can be aligned with the first index mark of the main body to facilitate mounting the central cap to the main body.

Preferably, the accommodating space of each of the bolt caps is a hexagonal space and each bolt cap has six sides at its outer surface to facilitate a tool holding the bolt cap.

The primary object of the present invention is to provide a wheel cover which can be cooperated with different sizes of nuts on different rims, and the wheel cover is easily and firmly connected to the rim without worry of the wheel cover dropping off.

The advantages of the present invention are as follows:

The present invention can be cooperated with different sizes of nuts on different rims by using the washers.

The present invention can easily and firmly be connected to the rim without worry of the wheel cover dropping off.

The present invention can hide the axle and the nuts to prevent dust from entering the inside of the wheel cover, and can protect the axle and the nuts.

The present invention meets requirements of aesthetic purpose.

The wheel cover has an electro-plating layer on outside thereof and the insulation plate is installed between the main body of the wheel cover and the rim, so as to prevent electrochemical reaction between the wheel cover and the rim. The strength of the alloy rim is not weakened and the life of the rim is prolonged.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 8 is an enlarged cross sectional view, which shows the portion circled with "B" in FIG. 6, wherein no washer is used.

DETAILED DESCRIPTION OF THE PREFERRED EMBODIMENT

Figure 1:
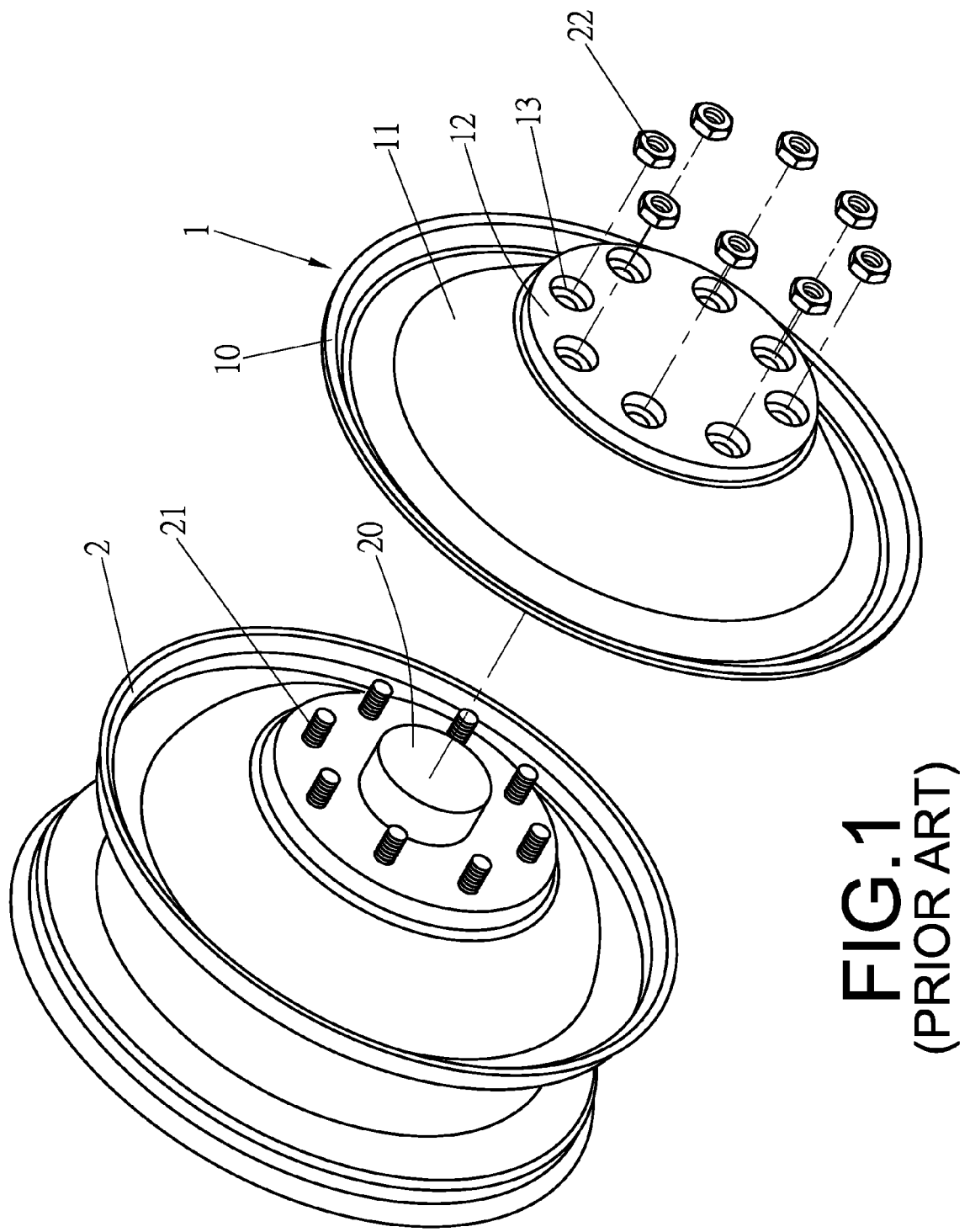
FIG. 1 is an exploded view of a conventional wheel cover installed to a rim of a front wheel.
Figure 2:
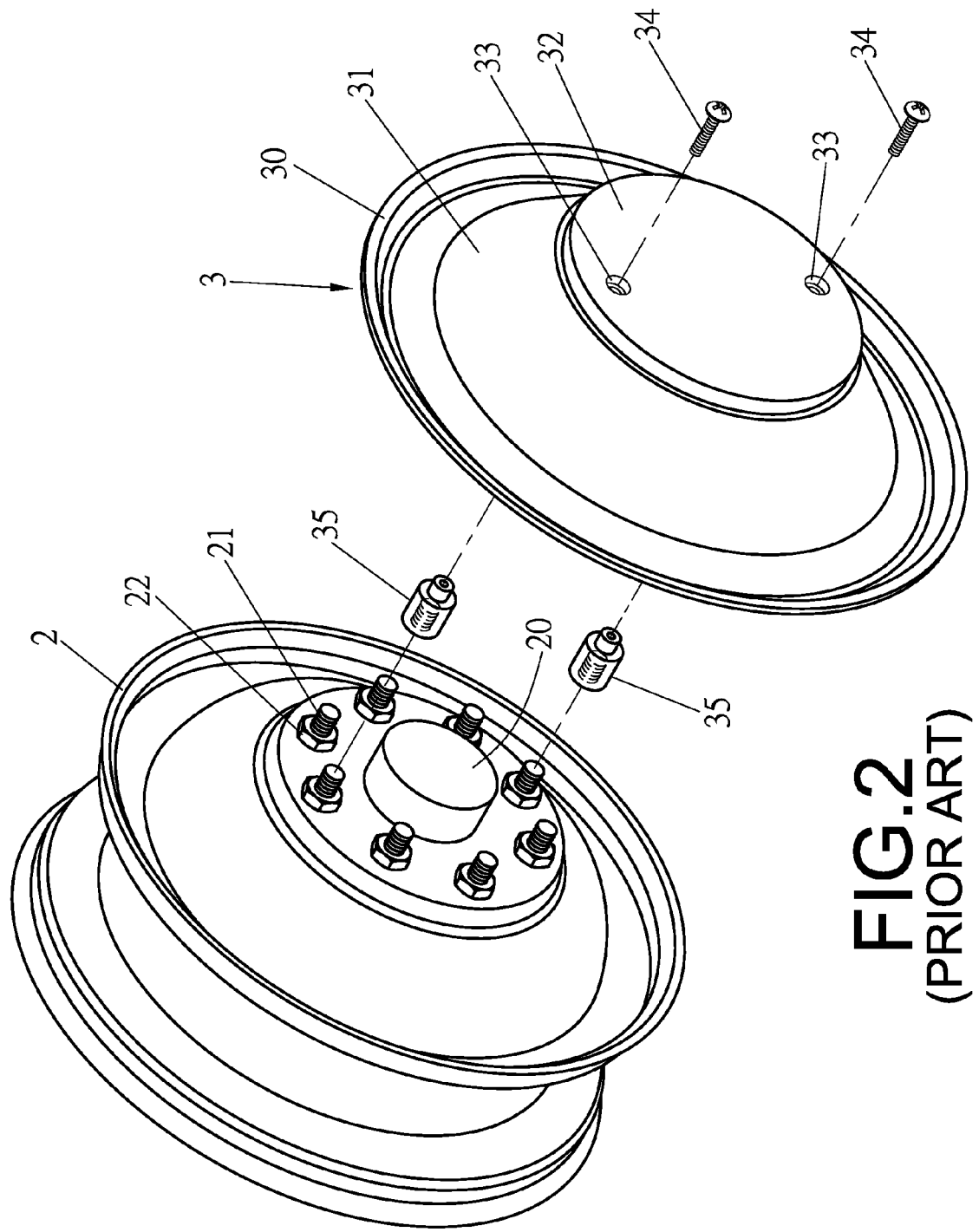
FIG. 2 is an exploded view of another conventional wheel cover installed to a rim of a front wheel.
Figure 3:
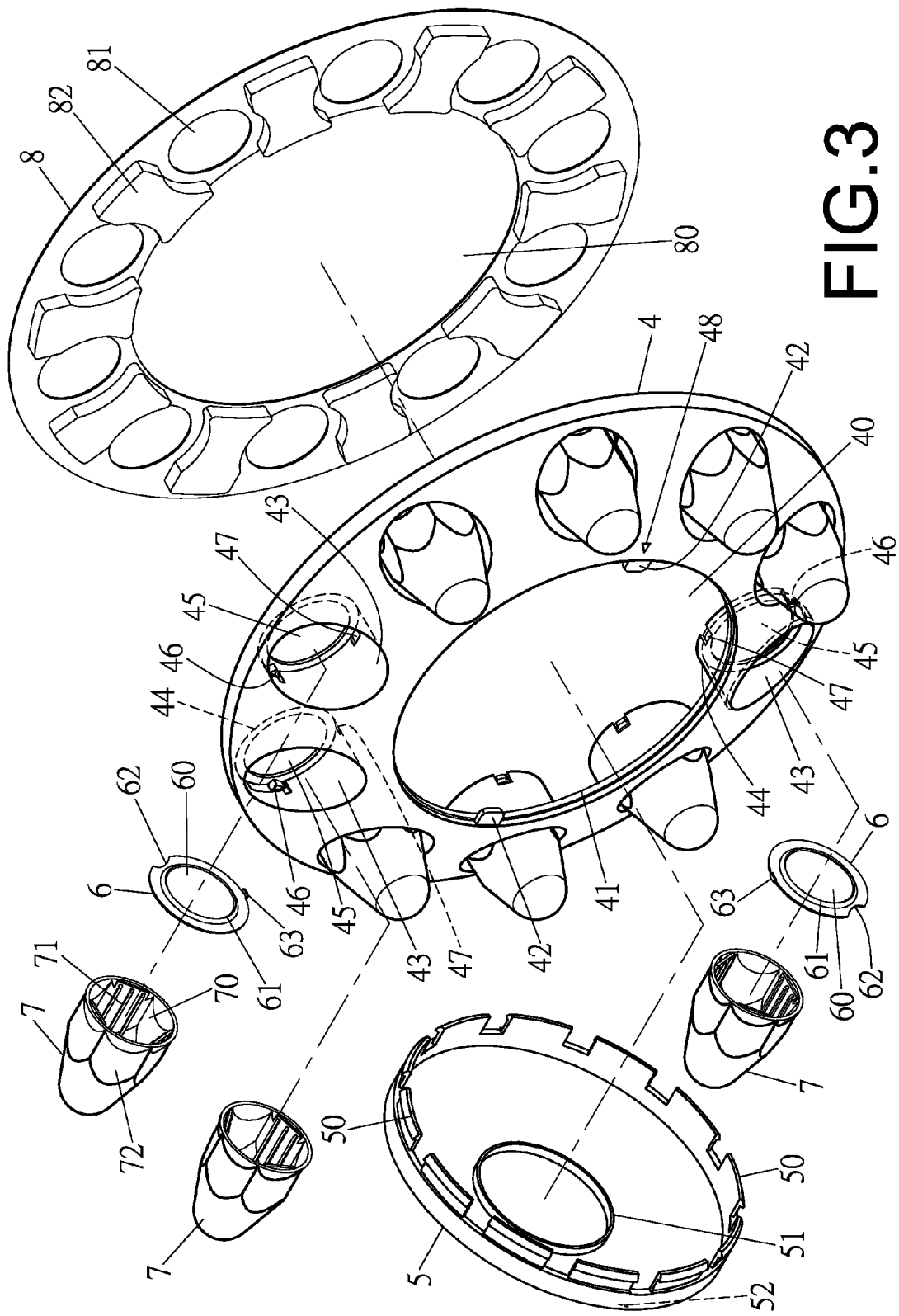
FIG. 3 is an exploded view of one embodiment of a wheel cover of the present invention.
Figure 4:
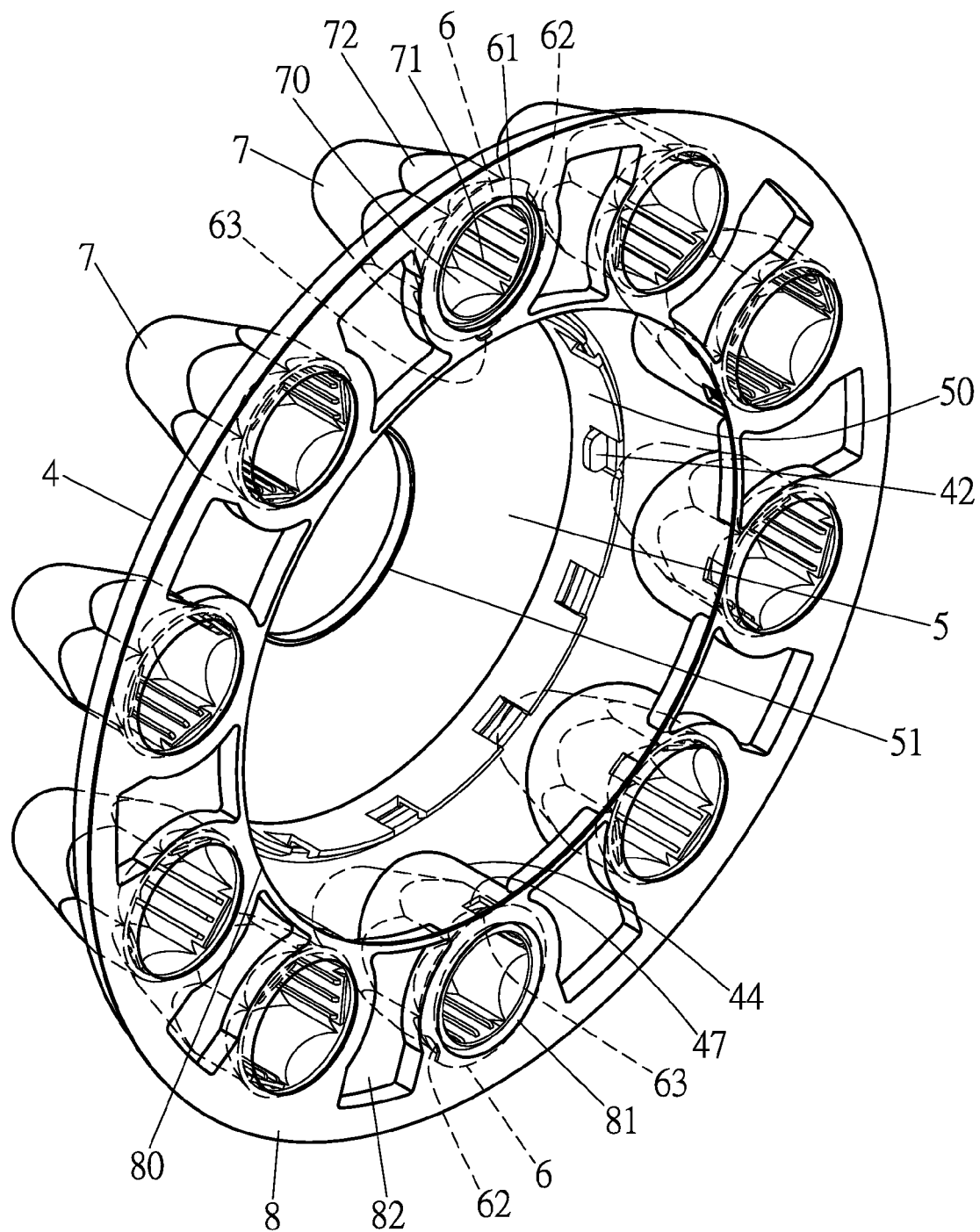
FIG. 4 is a perspective view of the wheel cover of the present invention.
Figure 5:
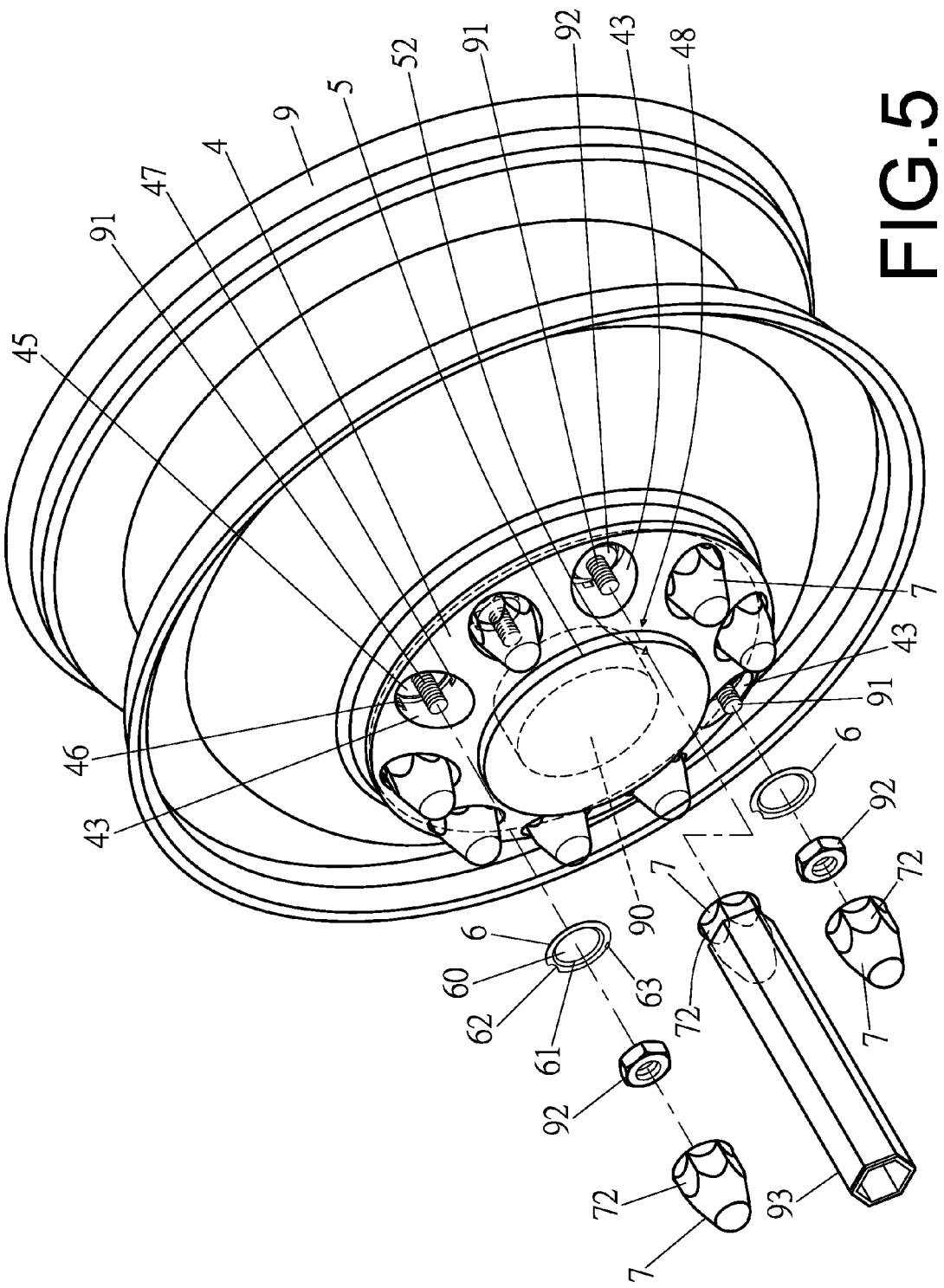
FIG. 5 is a schematic view, which shows a tool being used to install the wheel cover of the present invention to a rim.
Figure 6:
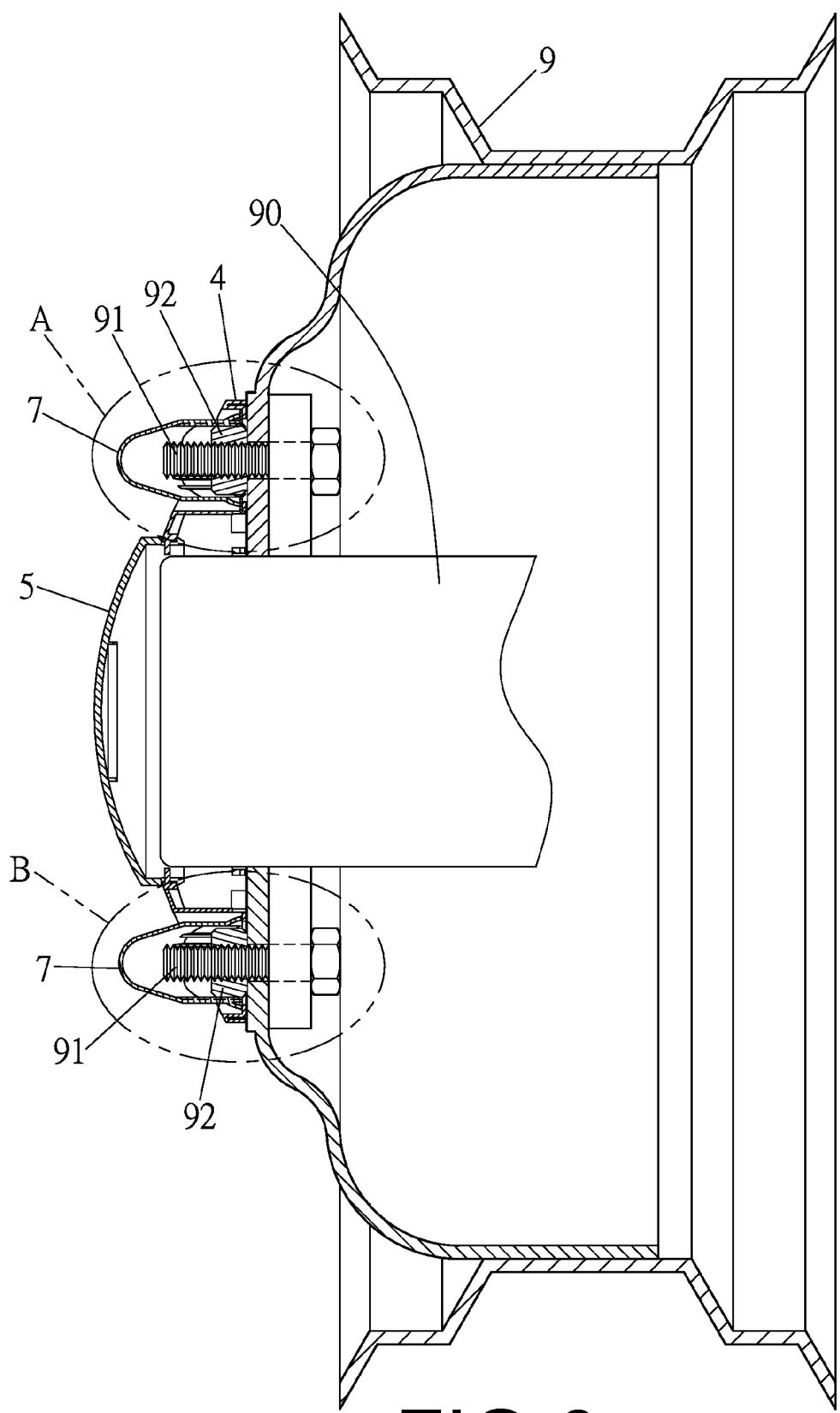
FIG. 6 is a cross sectional view of the wheel cover of the present invention being installed to a rim.

Referring to FIGS. 3, 4 and 5, a wheel cover for a front wheel of a truck according to one embodiment of the present invention is shown, which comprises a main body 4, a central cap 5, at least two washers 6, multiple bolt caps 7, and an insulation plate 8. The main body 4 defines a central hole 40 and multiple recesses 43 around the central hole 40 for receiving bolts 91 and nuts 92 provided for a rim 9 of a front wheel of a truck. Each recess 43 is formed by a surrounding wall 44 and a bottom with a through hole 45, wherein the surrounding wall 44 and the bottom constitute part of the main body 4. The surrounding wall 44 of each recess 43 defines a positioning hole 47 and a resilient protrusion 46 near the bottom of the recess 43. The main body 4 is provided with an engagement ring 41 and two opposite engagement tabs 42 at an inner edge thereof which defines the central hole 40. Furthermore, the main body 4 is provided with a first index mark 48 near its inner edge.

The central cap 5, which is provided for covering the central hole 40 of the main body 4, has multiple insertions 50 extending from its outer edge and has an enclosed flange 51 at its inner surface. Furthermore, the central cap 5 is provided with a second index mark 52 near its outer edge, which can be aligned with the first index mark 48 of the main body 4 to facilitate mounting the central cap 5 to the main body 4.

Figure 7:
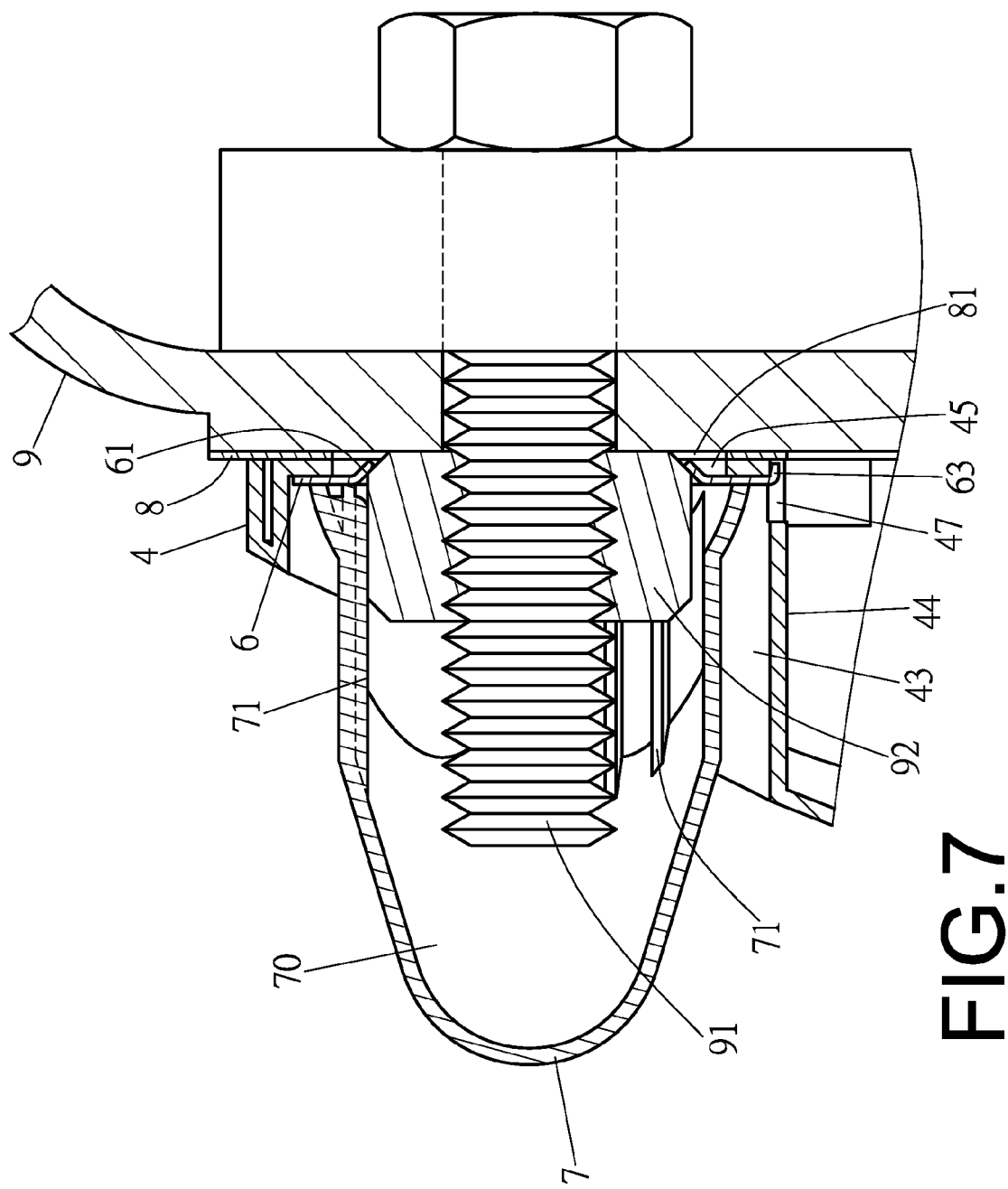
FIG. 7 is an enlarged cross sectional view, which shows the portion circled with "A" in FIG. 6, wherein a washer is used.

Each of the washers 6 has an inner circular edge and an outer circular edge, wherein the inner circular edge is formed into an engagement ring 61 and defines a central hole 60, and the outer circular edge defines a notch 62 and is provided with an engaging member 63. In use, each washer 6 is fitted in one of the recesses 43, around the corresponding bolt 91 and fixed by the corresponding nut 92 (see FIG. 7), such that the notch 62 is engaged with the resilient protrusion 46 provided at the surrounding wall 44 of the recess 43, while the engaging member 63 is engaged with the positioning hole 47 defined at the surrounding wall 44 of the recess 43.

Each of the bolt caps 7 is fitted into one of the recesses 43 of the main body 4 and defines a hexagonal space 70 for accommodating the corresponding bolt 91 and the corresponding nut 92, wherein an inner surface of each bolt cap 7 that defines the hexagonal space 70 is provided with multiple ridges 71 for engaging with the corresponding nut 92. Furthermore, each bolt cap 7 has six sides 72 at its outer surface to facilitate a tool 93 holding the bolt cap (see FIG. 5).

The insulation plate 8 defines a central hole 80 and multiple through holes 81 around the central hole 80, wherein the central hole 80 has a dimension generally same as the central hole 40 of the main body 4, and the through holes 81 are arranged corresponding to the recesses 43 of the main body 4. Furthermore, the insulation plate 8 is provided with multiple positioning blocks 82 around the central hole 80, wherein the through holes 81 and the positioning blocks 82 are alternately arranged around the central hole 80. In use, the insulation plate 8 is located between the main body 4 and an outer surface of the rim 9 of the front wheel, such that the central hole 80 of the insulation plate 8 is aligned with the central hole 40 of the main body 4, while the through holes 81 of the insulation plate 8 are aligned with the recesses 43 of the main body 4 respectively.

As shown in FIGS. 3 to 8, when assembling, two of the nuts 92 on the rim 9 are removed from the bolts 91, and the second index mark 52 of the central cap 5 is aligned with the first index mark 48 of the main body 4. The central cap 5 is installed in the central hole 40 of the main body 4 to engage the insertions 50 of the central cap 5 with the engagement ring 41 on the central hole 40 of the main body 4. The engagement tabs 42 on the body 4 are each located between two adjacent insertions 50 to position the central cap 5 to the central hole 40 of the main body 4. The insulation plate 8 is then connected to the inside of the body 4 such that the plate is located between the main body 4 and an outer surface of the rim 9 of the front wheel and the central hole 80 of the insulation plate 8 is aligned with the central hole 40 of the main body 4. The through holes 81 of the insulation plate 8 are located in alignment with the through holes 45 of the bottoms of the recesses 43 of the main body 4. The positioning blocks 82 on the insulation plate 8 are arranged alternately with the surrounding walls 44 of the main body 4. The main body 4, together with the central cap 5 and the insulation plate 8, is mounted to the rim 9, such that the bolts 91, with or without nuts 92, are inserted through the through holes 81 of the insulation plate 8 and the through holes 45 of the bottoms of the recesses 43 of the main body 4. Thereafter, the two bolts 91, from which the two nuts 92 are previously removed, are respectively fitted with the two washers 6, so that the notch 62 of each washer 6 is engaged with the resilient protrusion 46 provided at the surrounding wall 44 of the corresponding recess 43, while the engaging member 63 of each washer 6 is engaged with the positioning hole 47 defined at the surrounding wall 44 of the corresponding recess 43 (see FIG. 7). Thereafter, the two washers 6 can be respectively fixed by the two nuts which are previously removed. The nuts 92 contact the washers 6 and are threadedly connected to the bolts 91. By the washers 6, the main body 4 is firmly connected to the rim 9 and does not drop from the rim 9. The tool 93 is then fitted over each of the bolt caps 7 and engaged with the six sides 72 of each bolt cap 7 (see FIG. 5), to position the bolt caps 7 in the recesses 43 one by one. The ridges 71 of each of the bolt caps 7, which engage with the corresponding nut 92, allow the bolt cap to be firmly connected with the nut 92. The axle 90, the bolts 91 and the nuts 92 on the rim 9 are then covered by the wheel cover. The wheel cover is easily and quickly installed without worry of loosening and dropping from the rim 9. When the diameter of the nuts 92 is small, the washers 6 with a small central hole 60 are chosen; when the diameter of the nuts 92 is large, the washers 6 with a large central hole 60 are chosen. Therefore, any rims with nuts of different sizes can be used with the wheel cover of the present invention, the manufacturers do not necessarily make different main bodies 4 with different through holes 45, and this saves the expense.

The present invention can hide the axle 90, the bolts 91 and the nuts 92 to prevent dust from entering the inside of the wheel cover, and can protect the axle and the nuts. The present invention meets requirements of aesthetic purpose. The main body 4 and the bolt caps 7 each have their electroplating layers on their outer surfaces, and the insulation plate 8 is installed between the main body 4 of the wheel cover and the rim 9, so as to prevent electrochemical reaction between the main body 4 and the rim 9, so that the rim 9 can be protected from being corroded. The strength of the alloy rim 9 is not weakened and the life of the rim 9 is prolonged.

While we have shown and described the embodiment in accordance with the present invention, it should be clear to those skilled in the art that further embodiments may be made without departing from the scope of the present invention.

What is claimed is:

1. A wheel cover, comprising:
   a main body defining a central hole and multiple recesses around the central hole for receiving bolts and nuts provided for a rim of a front wheel of a truck, each recess being formed by a surrounding wall and a bottom which constitute part of the main body, the bottom of each recess defining a through hole, the surrounding wall of each recess defining a positioning hole and provided with a resilient protrusion near the bottom of the recess;
   a central cap for covering the central hole of the main body, the central cap having multiple insertions extending from an outer edge of the central cap;
   at least two washers, each of which has an inner circular edge and an outer circular edge, wherein the inner circular edge is formed into an engagement ring and defines a central hole, and the outer circular edge defines a notch and is provided with an engaging member, each washer being fitted in one of the recesses of the main body, around the corresponding bolt, and fixed by the corresponding nut such that the notch thereof is engaged with the resilient protrusion provided at the surrounding wall of the recess while the engaging member thereof is engaged with the positioning hole defined at the surrounding wall of the recess;
   multiple bolt caps, each of which is fitted into one of the recesses of the main body and defines a space for accommodating the corresponding bolt and the corresponding nut, wherein an inner surface of each bolt cap that defines the accommodating space is provided with multiple ridges for engaging with the corresponding nut; and
   an insulation plate defining a central hole and multiple through holes around the central hole of the insulation plate, the insulation plate being provided with multiple positioning blocks around its central hole, the through holes of the insulation plate and the positioning blocks of the insulation plate being alternately arranged, the insulation plate being located between the main body and an outer surface of the rim of the front wheel such that the central hole of the insulation plate is aligned with the central hole of the main body while the through holes of the insulation plate are aligned with the recesses of the main body.

2. The wheel cover as claimed in claim 1, wherein the main body is provided with an engagement ring and two engagement tabs at an inner edge thereof which defines the central hole of the main body, the central cap being mounted to the main body such that the insertions thereof are engaged with the engagement ring of the main body, while each of the engagement tabs of the main body is located between two adjacent insertions of the central cap.

3. The wheel cover as claimed in claim 1, wherein the central cap has an enclosed flange at its inner surface.

4. The wheel cover as claimed in claim 1, wherein the main body is provided with a first index mark near an inner edge thereof which defines the central hole of the main body, while the central cap is provided with a second index mark near its outer edge, which can be aligned with the first index mark of the main body to facilitate mounting the central cap to the main body.

5. The wheel cover as claimed in claim 1, wherein each bolt cap has six sides at its outer surface to facilitate a tool holding the bolt cap.

\* \* \* \* \*